United States Patent
Rass et al.

(10) Patent No.: US 9,642,388 B2
(45) Date of Patent: *May 9, 2017

(54) UTILIZATION OF HULLED RAPE SEED

(75) Inventors: Michael Rass, Tecklenburg (DE); Christian Schein, Ibbenburen (DE)

(73) Assignee: Teutoburger Ölmühle GmbH & Co. KG, Ibbenburen (DE)

( * ) Notice: Subject to any disclaimer, the term of this patent is extended or adjusted under 35 U.S.C. 154(b) by 1398 days.

This patent is subject to a terminal disclaimer.

(21) Appl. No.: 13/499,463

(22) PCT Filed: Sep. 11, 2010

(86) PCT No.: PCT/EP2010/005575
§ 371 (c)(1),
(2), (4) Date: Sep. 19, 2012

(87) PCT Pub. No.: WO2011/029611
PCT Pub. Date: Mar. 17, 2011

(65) Prior Publication Data
US 2013/0001333 A1     Jan. 3, 2013

(30) Foreign Application Priority Data

Sep. 11, 2009 (DE) .................. 10 2009 040 925
Mar. 2, 2010 (CH) ........................ 276/10

(51) Int. Cl.
| | |
|---|---|
| A23L 27/14 | (2016.01) |
| A21D 2/26 | (2006.01) |
| A23L 27/10 | (2016.01) |
| A23L 33/105 | (2016.01) |
| A23L 33/185 | (2016.01) |

(Continued)

(52) U.S. Cl.
CPC .............. A23L 27/14 (2016.08); A21D 2/266 (2013.01); A23L 13/20 (2016.08); A23L 13/426 (2016.08);
(Continued)

(58) Field of Classification Search
None
See application file for complete search history.

(56) References Cited

U.S. PATENT DOCUMENTS

| | | | |
|---|---|---|---|
| 3,758,452 A | 9/1973 | Owen | |
| 4,083,836 A * | 4/1978 | Anjou | .............. A23J 1/142 |
| | | | 426/417 |

(Continued)

FOREIGN PATENT DOCUMENTS

| | | |
|---|---|---|
| DE | 10046769 A1 | 4/2002 |
| EP | 1074605 A1 | 2/2001 |

(Continued)

OTHER PUBLICATIONS

Salminen, H. et al., "Inhibition of protein and lipid oxidation by rapeseed, camelina and soy meal in cooked pork meat patties," European Food Research and Technology, vol. 223, No. 4, 461-468, (Jan. 18, 2006).

(Continued)

*Primary Examiner* — Elizabeth Gwartney
(74) *Attorney, Agent, or Firm* — Dinsmore & Shohl LLP

(57) ABSTRACT

A method for processing rapeseed includes dehulling and separating the rapeseed into kernel fractions and husk fractions. The kernel fractions are subjected to one or more pressings so as to obtain oil and an oil cake, the oil cake having solid content and oil content. The oil cake is subjected to at least one further milling process so as to provide an output that is a base material, filler material or additive for human foods.

12 Claims, 4 Drawing Sheets

(51) Int. Cl.
   *A23L 13/40* (2016.01)
   *A23L 25/00* (2016.01)
   *A23L 13/20* (2016.01)

(52) U.S. Cl.
   CPC .............. *A23L 25/30* (2016.08); *A23L 27/10* (2016.08); *A23L 33/105* (2016.08); *A23L 33/185* (2016.08)

(56) References Cited

U.S. PATENT DOCUMENTS

| | | | |
|---|---|---|---|
| 4,148,789 | A | 4/1979 | Kozlowska et al. |
| 7,074,449 | B1 | 7/2006 | Holley et al. |
| 7,790,207 | B2 | 9/2010 | Green et al. |
| 2003/0072866 | A1 | 4/2003 | Higgs et al. |
| 2007/0077318 | A1 | 4/2007 | Pons-Andreu et al. |
| 2008/0193629 | A1 | 8/2008 | Pons-Andreu et al. |

FOREIGN PATENT DOCUMENTS

| | | | |
|---|---|---|---|
| LV | 13176 | B | 8/2004 |
| WO | 2007066120 | A1 | 6/2007 |
| WO | 2008024840 | A2 | 2/2008 |

OTHER PUBLICATIONS

Guderjan, M., et al., "Application of pulsed electric fields at oil yield and content of functional food ingredients at the production of rapeseed oil," Innovative Food Science & Emerging Technologies, 8 (2007) 55-62.

Carre, P., "Review and Evaluation Major and Most Promising Technologies for Oil Seed Pretreatment and Extraction," Deliverable 2.1., Sustoil-Projekt. Creol, Pressac (FR), Jan. 2009, URL: http://www.york.ac.uk/res/sustoil/Pages/Deliverable%202.1%20FINA.pdf?bcsi_scan_9417402D1844F863=jlslYbPiO3RW0bFBozsLfrEFkFEOAAAAtROuBA==&bcsi_scan_filename=Deliverable%202.1%20FINA.pdf[abgerufen am Feb. 8, 2010] (pp. 1-44).

Naczk, M., "Current research developments on polyphenoloics of rapeseed/canola: a review," Food Chemistry, vol. 62, No. 4, pp. 489-502, 1998.

Kracht, W. et al., "Effect of dehulling of rapeseed on feed value and nutrient digestibility of rape products in pigs," Archives of Animal Nutrition, 58:5, 389-404.

"Flexibilitat ist gefragt," Process, 2007. URL: http://www.process.vogel.de/article56362/?icmp=aut-artikel-artikel-55 [abgerufen am Mar. 8, 2010].

* cited by examiner

UTILIZATION OF HULLED RAPE SEED

REFERENCE TO RELATED APPLICATIONS

This patent application is a U.S. National Phase of PCT/EP2010/005575, filed Sep. 11, 2010, which claims priority to DE 10 2009 040925.4, filed Sep. 11, 2009, and CH 00276/10, filed Mar. 2, 2010, the entire contents of which are incorporated herein in their entirety.

FIELD OF THE INVENTION

The invention relates to a method for processing rapeseed, wherein they are dehulled and are separated into kernels (parenchyma tissue and radicle) and husk fractions and wherein the kernels are subjected to one or more pressings to obtain oil and in so doing an oil cake having a solid and oil content remains, as well as to a use of an oil cake and to a powdery product.

BACKGROUND OF THE INVENTION

It is known to use rapeseed to obtain oil by pressing. It is further known from EP 1 074 605 B1 to dehull the rape grains before their pressing and to separate the kernel fractions and the husk fractions from one another. Rape oil is then obtained from the light, yellow kernel fractions by pressing which then likewise has a yellowish color pleasing to the customer.

There is the problem on such a pressing that only around a third of the pressed material accrues as high-quality oil and approximately two-thirds remain as oil cake having a solid and oil content.

It is therefore furthermore known in turn to supply substantially blackish gray husk fractions to the remaining oil cake and to subject the mixture thus obtained to a further pressing in order thereby to increase the oil fraction obtained overall.

The oil cake having a solid content still remaining after this further pressing is of an overall grayish green color due to the reintroduced husk fractions having anti-nutritional ingredients and is for this reason alone only used as animal feed or as an admixture.

SUMMARY OF THE INVENTION

It is the underlying problem of the invention to provide a high-quality use of oil cakes in rape processing.

Not only the pressed out oil can be used as a food by the method in accordance with the invention, but also an oil cake remaining in the process so that the total degree of utilization of the rapeseed increases substantially. Since the oil cake is subjected to a further milling process, a fine powder arises which is suitable as a base material, a filler material or as an additive for human foods.

The further milling process in particular includes a cryogenic milling so that a milling is also possible without a sticking together of the tools involved in the milling process with a relatively high residual oil content in the supplied milling material.

In this respect, fractions of the oil cake are particularly favorably supplied as the milling material in frozen form so that the oil fractions cannot escape as a liquid. It is furthermore favorable if a beating of the supplied milling material takes place in this further milling process in a pin disk mill comparatively insensitive to sticking.

Alternatively or additionally, the further milling process can include an oil separation of the supplied milling material, in particular by extraction, so that the residual oil content in the processed oil cake can also fall by this measure and its processing is facilitated.

Provided that only kernel fractions of the rape grains are supplied to the further milling process without the addition of husk fractions and are subsequently used as a base food material or as a food filler material, it is ensured that the material thus arising retains the light color of the kernels without being impaired in its aesthetic effect by husk fractions. Anti-nutritional portions contained in the husk such as waxes or polyphenols are thus also kept out of the food formed.

Milling is advantageously so fine that the base material, filler material or additive forms a powder having grain sizes of around 100 µm to 500 µm.

Such a powder can serve as a base material for a protein extraction (protein concentration and/or protein isolation) since the raw fiber with anti-nutritional components is at least largely removed due to the reduction of husk fractions and in addition a high protein content is present in the powder due to the oil reduction. The rape proteins in this process contain a number of important amino acids. In addition, an extraction has already taken place by the cold or hot milling.

With the high protein content, the low oil and husk fractions and its grain size, this powder is very suitable as a base material, filler material or additive for dry spices, spice mixtures or spice preparations, but also as a fraction which can be stirred into spice sauces.

The created base material, filler material or additive can advantageously also be mixed into sausage products and raise their nutritional value and volume.

The finer the formed powder is, the more easily it can also be mixed as a healthy base material, filler material or additive of high nutritional value into bakery products or also into other food bodies such as snacks, muesli bars or similar. A denaturation of the proteins is avoided by a very advantageous consistent cold manufacture; very good physical properties also thereby result so that such a powder can, for example, also be extruded and can thus form an adhering crosslinking for pressed articles such as pellets, peanut puffs or similar.

The use of an oil cake obtained in the processing of rapeseed and containing kernel fractions of the rapeseed as a base material, filler material or additive for human foods is claimed separately.

The use of an oil cake obtained in the processing of rapeseed and containing kernel fractions of the rapeseed as a basis for protein extraction and for a food to be formed therefrom is likewise claimed separately.

BRIEF DESCRIPTION OF THE FIGURES

Further advantages and features of the invention result from embodiments of the subject matter of the invention shown in the drawing and described in the following.

DETAILED DESCRIPTION OF THE INVENTION

Figure 1:
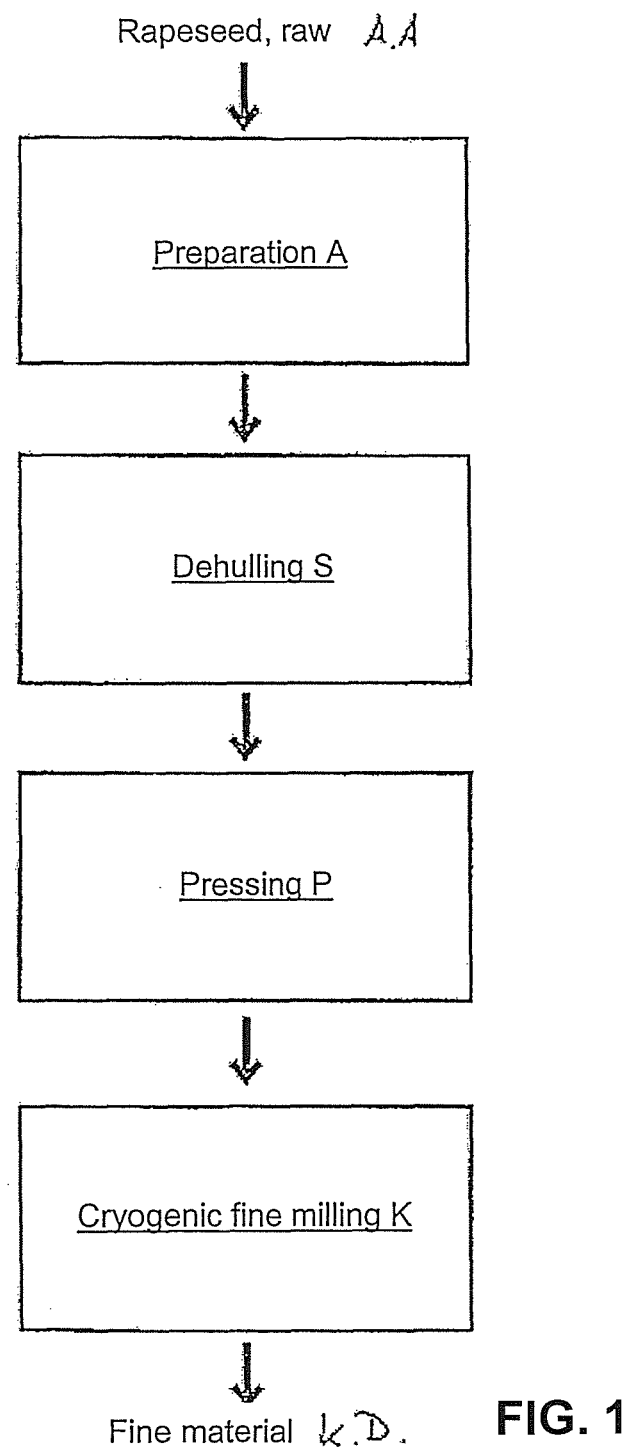
FIG. 1 is a schematic flowchart of a method in accordance with the invention.

In accordance with the flowchart shown in FIG. 1, the supplied and still unsorted rapeseed A.A is first sorted in a preparation step A such that the rape grains A.E to be further processed have largely the same size.

Figure 2:
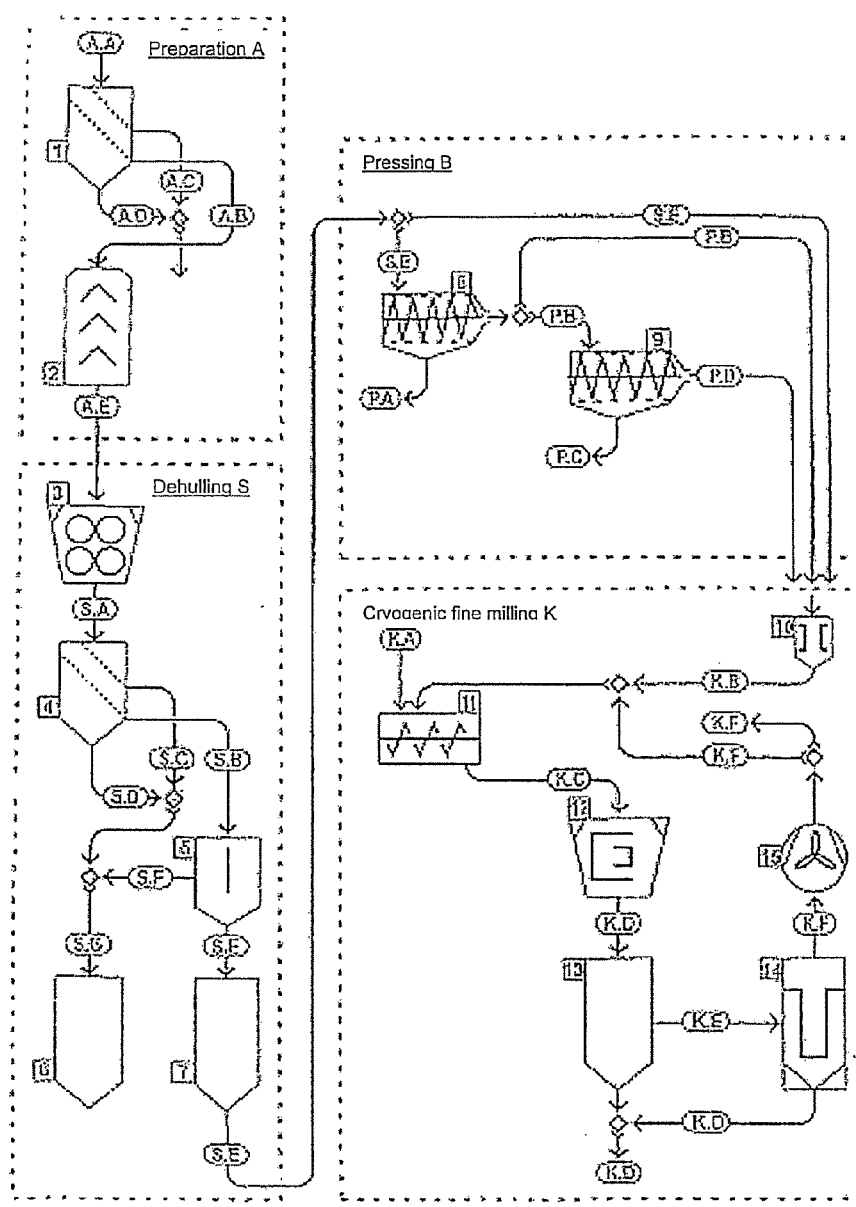
FIG. 2 is a detailed view of different method steps for FIG. 1.

They are then introduced into a device S for dehulling and are thereby separated into a husk fraction S.G and a kernel fraction S.E A pressing of the husks is possible; however, here only the pressing P of the kernels S.E is drawn in FIG. 2 and said kernels are then further supplied to a fine milling device K. In this process, both oil cake milled once P.B and oil cake milled a plurality of times P.D can be subjected to the fine milling. Unpressed kernels S.E can also be included in the fine milling.

In accordance with the embodiment in accordance with FIGS. 1 and 2, a cryogenic milling is carried out which works with frozen milling material so that the relatively high residual oil fraction in the milling material K.B cannot result in a smudging or sticking together of the machines.

Figure 3:
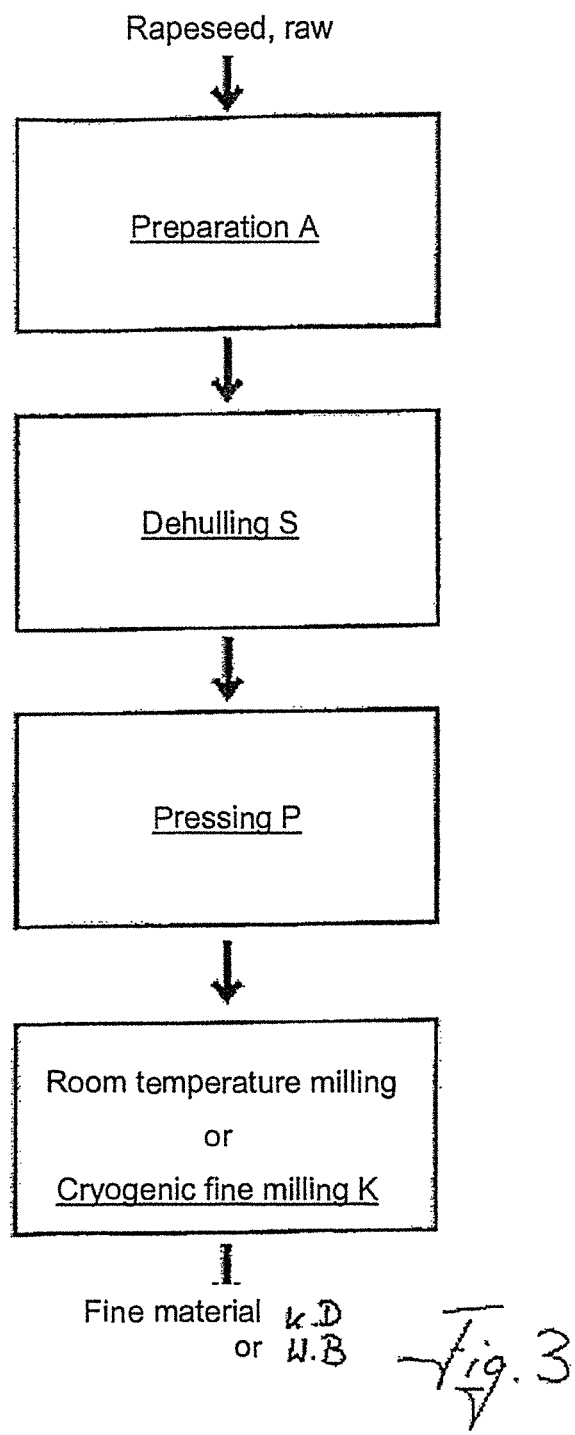
FIG. 3 is a schematic flowchart of an alternative method in accordance with the invention in which a choice can be made between cryogenic mill and at room temperature.
Figure 4:
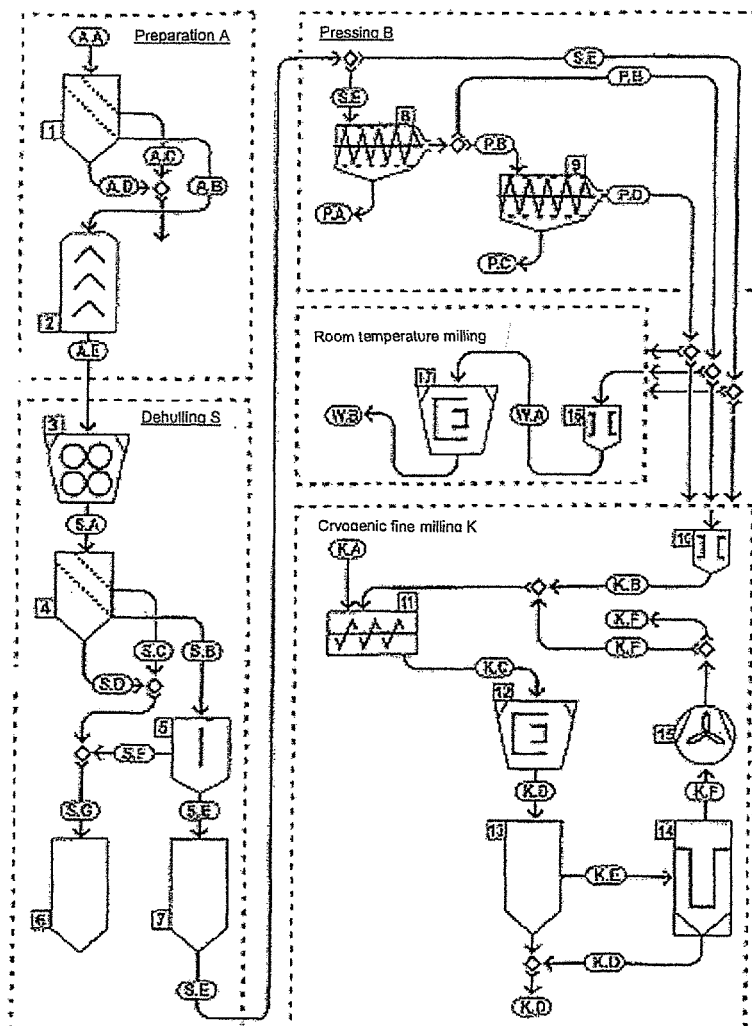
FIG. 4 is a detailed view of different method steps for FIG. 3.

Alternatively, it is shown in FIGS. 3 and 4 that a so-called milling process of the milling material W.A can also be carried out at room temperature while dispensing with a cost-intensive cooling with liquid nitrogen.

Also, under certain circumstances, a portion of the milling material K.B or W.A can be milled cryogenically and anther portion can be at room temperature.

A fine material K.D (or W.B: FIG. 4) is obtained as a result of the fine milling which forms a free-flowing powder having grain sizes of approximately 100 µm to 500 µm in an approximately Gaussian distribution. The powder K.D or W.B respectively has a light color due to the use of only the kernels without husks. This powder K.D can then be used directly as or at least as a base material, filler material or additive for a human food.

A powder K.D or W.B formed in this manner can in particular also serve as a starting material for a protein extraction (protein concentration and/or protein isolation) since it has a very high protein content with a lot of important amino acids and is liberated from disturbing raw fibers. Anti-nutritional substances such as chlorophyll, tannin, polyphenols, or phytic acid are therefore considerably reduced. Such a substance can also serve as a substitute for mustard in human food.

A lot of water can thus also be bound so that in sausage products, for example, the meat amount can be substantially reduced and the nutritional content can nevertheless be increased. A high stability can also be achieved, in foams for example, in protein isolates obtained from the powder K.D or W.B. Said foams therefore not only have very good nutritional properties, but likewise very good functional properties such as the addressed light, pleasant appearance and the high mechanical stability which is larger than that of whipped animal protein. In addition, substantially more vegan foods can be created by the substitution of animal products with the product in accordance with the invention and the need for factory farming can be reduced.

The powder K.D or W.B can in particular also form base materials, filler materials or additives in spices, spice mixtures, spice preparations or spice sauces. The obtained fine material can also be readily used as a filler material for powdery spices due to its light powder structure and can there replace lactose or dextrose, for example. In contrast to many other oilseeds, rape has a mild spicy aroma and therefore supports the spice aromas.

It is equally possible to mix the obtained fine material K.D or W.B as a base material, filler material or additive into sausage products or in other food bodies or to use it in bakery products since, as mentioned above, it has a mild spicy aroma without unpleasant hotness.

In detail, in the preparation of the initially unsorted raw rapeseed A.A, a cleaning of the rapeseed is first carried out in the screening machine 1 so that impurities A.C and shriveled grains A.D can be separated out and the cleaned rapeseed A.B can be dried in a seed dryer 2, for instance in an airflow.

The rape grains A.E cleaned and dried and having an approximately standard size in this manner are then supplied to dehulling S where they are first crushed in a double mill 3 in the gap between the rolling mills. The crushed rape S.A arising in this process is supplied to a screening machine 4 in which coarsely crushed material S.C and finely crushed material S.D are separated out and the so-called useful crushed material are transferred onward into a sifter 5. In said sifter, the husks S.F are separated out and are supplied overall with the coarsely crushed material S.C and the finely crushed material S.D to a silo 6 as a so-called husk fraction S.G and are further processed depending on their purpose. This further processing can, for example, be an admixture to an oil cake of the kernel fraction S.E which is temporarily stored in a parallel silo 7. The fraction of oil obtained overall can be increased by this admixture and repeat pressing; however, the oil cake is then charged with the dark husk fractions so that its optical appearance—and thus the possibility of use as a raw material for food—is limited and it is further used, for example, as animal feed.

Provided that the visual appearance does not play any role, such an oil cake can also be further used in the manner as is described in the following for the kernel fraction S.E.

This dehulled kernel fraction S.E is supplied to a single-stage or multi-stage pressing unit P. As is drawn by way of example in FIG. 2, two screw presses 8, 9 are provided there.

A first pressing of the dehulled rape S.E is carried out in the screw press 8 so that the kernel oil P.A of the first pressing can be obtained. The kernel cake P.B of the first pressing can be subjected to a second pressing in the second press 9 so that the oil yield increases and the kernel oil P.C can be additionally obtained. The kernel cake P.D of the second pressing (or of a further pressing) can, like the kernel cake P.B of the first pressing and/or also unmilled rape kernels S.E, be supplied as an individual fraction or as a mixture of these fractions overall to the fine milling K or W.

The fine milling K is here a cryogenic fine milling, i.e. the milling material is K.B frozen in a cooler 11, here a paddle screw cooler, after passing through a metal separator 10. Liquid nitrogen K.A is introduced here into this cooler 11 so that the oil fraction still contained in the milling material (typically around 10% for the second pressing and 22% for the first pressing) does not smudge or stick together the milling device.

The frozen milling material K.C is beaten in a pin disk mill 12 and is thereby converted into the desired fine material K.D of fine grain in the order of magnitude of 100 µm to 500 µm and is introduced into a collection tank 13. The separation gas K.E is removed from the fine material K.D via a filter 14 and a fan 15. The nitrogen K.F can be used in a circuit again for cooling.

The further milling process does not necessarily have to include a cryogenic milling process, but can additionally or alternatively also include a further oil separation before the milling of the supplied milling material, in particular by extraction.

Alternatively, a hot milling W without nitrogen cooling is also shown in FIGS. 3 and 4 in which a pin disk mill 17 is likewise provided for milling the milling material W.A and in which a powder W.B is likewise obtained at the end.

Since only kernel fractions of the rape grains are supplied to the further milling process without the addition of husk fractions, the obtained fine milling material K.D, W.B also remains light yellow and without the fractions which are under certain circumstances unwanted for foods and are contained in the husk fractions.

A use of an oil cake P.B, P.D obtained in the processing of rape grains A.A and containing kernel portions S.E of the rape grains as a base material for human food is shown for the first time by the invention. The value creation of the rapeseed is substantially increased since not only just the oil, but also the oil cake is utilized as a high-quality material for food production.

The powder K.D obtained in this manner is in this respect usable in a varied manner, for instance as a base material in particular for spices, spice mixtures, spice preparations or spice sauces, for sausage products or bakery products or for other food bodies or as a base material for a protein extraction for creating very high protein human foods. A heating or a chemical modification of this powder K.D, W.B is not necessary in this respect, and nor is an injection of fungi or other additives; it is rather usable directly as a base food product or as an addition product.

The powder K.D, W.B can, however, also be further processed in different manners, in particular also the food formed by the powder can, for example, also be heated or deep frozen.

| Reference numeral list: | |
|---|---|
| A.A | rapeseed, raw |
| A.B | rapeseed, cleaned |
| A.C | impurities, |
| A.D | shriveled grain |
| A.E | rapeseed, dried |
| S.A | crushed rape |
| S.B | useful crushed material |
| S.C | coarsely crashed material |
| S.D | finely crashed material |
| S.E | dehulled rape |
| S.F | husks |
| S.G | husk fraction |
| P.A | kernel oil, 1st pressing |
| P.B | kernel cake, 1st pressing |
| P.C | kernel oil, 2nd pressing |
| P.D | kernel cake, 2nd pressing |
| K | cryogenic milling |
| K.A | nitrogen, (liquid) |
| K.B | milling material |
| K.C | milling material, frozen |
| K.D | fine material |
| K.E | separation gas |
| K.F | nitrogen, (gaseous) |
| W | hot milling |
| W.A | milling material for hot milling |
| W.B | fine material |
| 1 | screening machine |
| 2 | seed dryer |
| 3 | double mill |
| 4 | screening machine |
| 5 | sifter |
| 6 | silo husks |
| 7 | silo dehulled rape |
| 8 | sieve screw press |

| Reference numeral list: | |
|---|---|
| 9 | sieve screw press |
| 10 | metal separator |
| 11 | paddle screw cooler |
| 12 | pin disk mill |
| 13 | collector tank |
| 14 | dust filter |
| 15 | fan |
| 17 | pin disk mill |

The invention claimed is:

1. A method for processing rapeseed, comprising:
dehulling and separating rapeseed so as to provide rapeseed kernel fractions and rapeseed husk fractions;
providing the rapeseed kernel fractions from the dehulling and separating step to a pressing step, the pressing step comprising subjecting the kernel fractions to one or more pressings, the pressing step providing oil and an oil cake, the oil cake having solid content and oil content;
providing the oil cake to at least one further milling process, the at least one further milling process being a cryogenic or a room temperature milling process, the at least one further milling process providing a powder having grain sizes from 100 μm to 500 μm, the powder comprised of kernels without husks and having a light color of the kernels, the powder being a base material, filler material or additive for human foods;
wherein the method for processing is a consistent cold manufacturing process such that a denaturation of proteins in the rapeseed is avoided and such that denaturation of proteins in the powder is prevented.

2. A method in accordance with claim 1, wherein the further milling process includes cryogenic milling.

3. A method in accordance with claim 1, wherein the further milling process includes a beating in a pin disk mill.

4. A method in accordance with claim 1, wherein the further milling process includes a step of oil separation by extraction from the oil cake.

5. A method in accordance with claim 1, wherein the output base material is a basis for a protein concentration and/or protein isolation.

6. A method in accordance with claim 1, wherein the output base material, filler material or additive is mixed into food bodies of human food.

7. A method in accordance with claim 1, wherein the output base material, filler material or additive forms a portion of spices, spice mixtures, spice preparations or spice sauces.

8. A method in accordance with claim 1, wherein the output base material, filler material or additive is mixed into sausage products.

9. A method in accordance with claim 1, wherein the output base material, filler material or additive is mixed into bakery products.

10. A rapeseed product made by the process of claim 1.

11. A human food product comprising:
a rapeseed product made by the process of claim 1.

12. A food product in accordance with claim 11, wherein:
the food product is selected from a group consisting of spices, spice mixtures, spice preparations, spice sauces, sausage products, and bakery products.

* * * * *